Feb. 28, 1928.　　　　　　　　　　　　　　　1,660,835
G. R. FOLDS
DEVICE FOR AUTOMATICALLY CREATING STORAGE RESERVES IN OIL STORAGE TANKS
Filed June 8, 1925
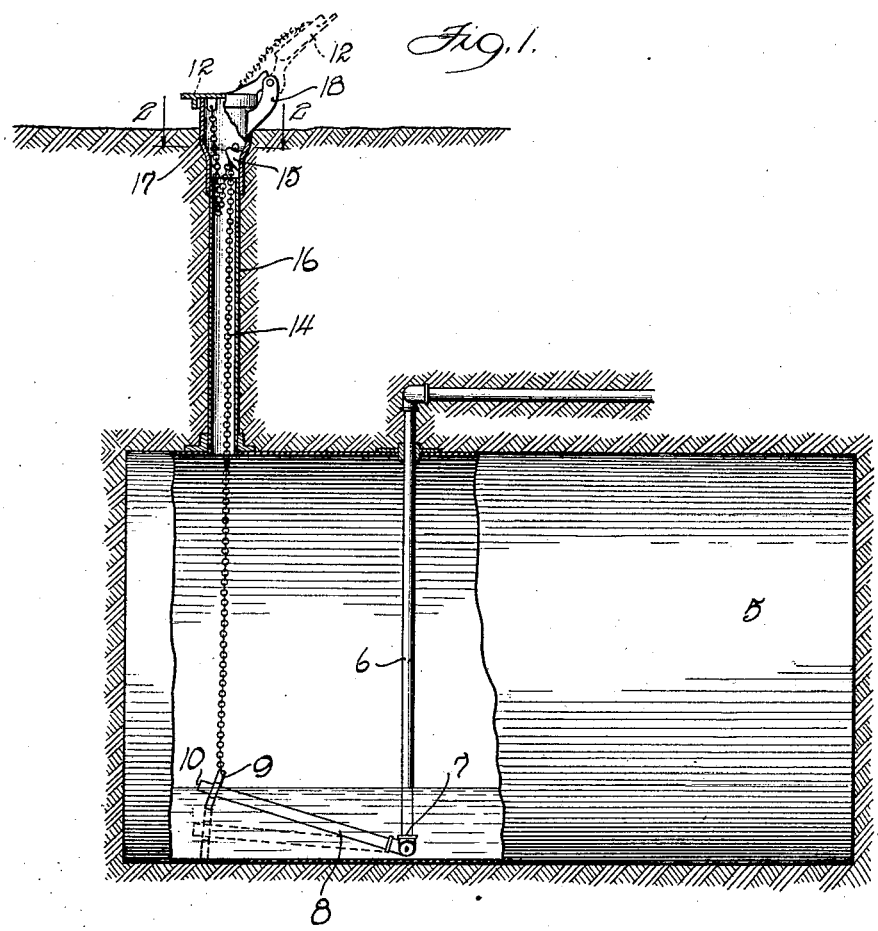
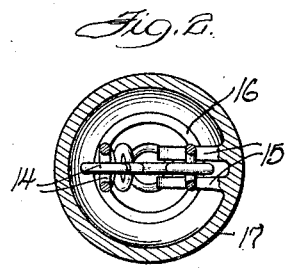

Patented Feb. 28, 1928.

1,660,835

UNITED STATES PATENT OFFICE.

GEORGE R. FOLDS, OF CHICAGO, ILLINOIS, ASSIGNOR TO COOK ELECTRIC COMPANY, OF CHICAGO, ILLINOIS, A CORPORATION OF ILLINOIS.

DEVICE FOR AUTOMATICALLY CREATING STORAGE RESERVES IN OIL-STORAGE TANKS.

Application filed June 8, 1925. Serial No. 35,835.

My invention relates to means for indicating a low liquid level in a tank, and more particularly to a device for automatically creating a storage reserve in an oil storage tank.

While I shall refer to an oil storage tank of a fuel burning system as the preferred embodiment of my invention, I do not intend limiting my invention solely thereto, as the invention is capable of use in other arts where it may be desirable to indicate a low level in a liquid container, irrespective of how or where the container may be employed.

I have found that considerable difficulty is experienced at the present time in keeping an oil storage tank filled. Where oil burning systems are employed as the heating unit for domestic use, the owner of the building is required to keep a record of oil in the storage tank, so that it will not be necessary to shut down the heating system at any time because the tank is empty. The danger of being required to shut down the heating system in winter is apparent. So far as I know the most practical method used is to record the number of days since the tank was last filled. I find that an oil gauge is not always watched, and as there is nothing to warn the approach of an empty tank by it except for its reading of the number of gallons pumped, it often fails in its utility unless the owner happens to be passing the gauge and observes the reading.

An object of my invention is to provide a device which effectively warns the owner that the oil supply in the storage tank is low, and affords an opportunity to replenish the supply without requiring the heating plant to be temporarily shut down.

According to the teachings of my invention, a storage tank is provided with a suction pipe entering therein. A flexibly connected arm is carried at the mouth of the pipe. This arm is adapted to be disposed in the bottom of the tank and to be movable in a vertical plane. Its open end may be brought to different levels by a manually operable connection extending to the top of the tank. A cover may be provided which will automatically raise this open end of the arm to its highest level. Hence it will be observed that it will not be necessary to rely on the oil man when refilling the tank to reset said arm. As soon as the oil level again lowers to a point where said open end of the arm lies, air will be drawn into the system and will thereby effectively indicate to the owner that the storage tank needs refilling. The cover may then be opened and the arm lowered. The time required in which to refill the tank depends, of course, on the reserve held within the lower end of the tank. That is, it depends on the level at which the arm is set when the tank is refilled.

I believe that I am the first to provide a device of this kind and shall accordingly claim the same broadly.

Other objects and advantages will be apparent from the following description which is to be read in connection with the accompanying drawings forming a part hereof.

In the drawings:

Figure 1 is a view partly in elevation and partly in section to illustrate an embodiment of my invention; and Fig. 2 is an enlarged cross-sectional view taken on line 2—2 of Fig. 1.

By referring more particularly to the drawings, a preferred embodiment of my invention comprises a fluid container or an oil storage tank 5 provided with an outlet pipe 6. In this disclosure, the pipe 6 is a suction pipe extending through the top of the tank to a point adjacent the bottom thereof. Suction pipe 6 represents the suction line of an oil burning system usually connecting the oil storage tank with the pump supplying oil to the burner as needed. It is, of course, understood that pipe 6, as shown, is one of the many forms of outlets that may be provided for tank 5, and consequently, this invention is not limited to a suction pipe for withdrawing fuel from said tank.

The lower end of pipe 6, indicated at 7, carries a pivotally mounted pipe arm 8. The conventional type of pivotal mounting for pipe 8 is merely illustrative of the different ways which this pipe arm may be connected to pipe 6. A stand 9 is fastened to pipe arm 8 near its open end 10 to prevent said open end from lying against the bottom of tank 5.

Tank 5 may be provided with a cover 12 interconnected by means of a chain 14 with pipe arm 8 for automatically raising this pipe arm to the position shown in full lines in Figure 1 when cover 12 is opened. The open position of cover 12 is shown in dotted lines in this figure and the purpose of this arrangement is automatically to create a reserve supply in the bottom of tank 5 at a time when cover 12 is opened to refill this tank. As a practical matter, it is better not to rely on the oil man when refilling tank 5 to reset pipe arm 10 to the position shown in full lines. Consequently, I have provided a pair of lugs 15 adjacent cover 12 for cooperating with the chain, when the cover is open, to hold pipe arm 10 in this full line position. Lugs 15 may be spaced apart a distance less than the crosswise dimension of the links, so that, when the cover is flipped back, chain 14 is first lifted and then moved between these lugs where it will be locked and prevented from dropping back into the tank. After the tank is refilled, the cover 12 may be closed, but pipe arm 8 will not drop to its lower position in the tank, and as a consequence, a fuel reserve indicated by the fuel represented in the tank is automatically provided.

A tank of the type shown in the drawings is usually buried in the ground adjacent the dwelling and has an extension 16 leading to the surface. A cap carrying member 17 may be secured to the end of extension 16, this cap carrying member having a pair of lugs 18 for pivotally carrying cover 12.

When it is found that the oil has been withdrawn from tank 5 to the level indicated in Fig. 1, the owner may open the cover and release chain 14 from its locked position between lugs 15. Lowering of the fuel to this level is usually indicated at the burner by the air sucked through the line at the open end 10. I have found that this serves as an ample warning to the owner because such a condition is readily noticeable to a person within the house being heated. With the pipe arm 8 in its lower position, enough oil is present in the tank to give the owner ample opportunity to refill the tank before being completely emptied. Stand 9 is provided to prevent mouth 10 from drawing through the line the sediment which is usually found at the bottom of the tank.

Broadly, my invention provides means for creating a storage reserve in tanks of this kind, and further, means for creating this storage reserve automatically when the cover of the tank is open for the purpose of refilling the tank. While I prefer embodying my invention in the device herein described and shown, I do not desire to be limited to this structure or to the details thereof. Various other forms and modifications will be apparent to one skilled in the art and consequently the invention is to be limited only by the scope of the appended claims.

I claim:

1. In a device of the type described, the combination of a fluid container, an outlet pipe extending into said container, a pipe arm pivotally connected to the end of said outlet pipe, a cover, a flexible connection between said pipe arm and said cover for varying the level of the open end of said pipe arm in said container, and means cooperating with said connection for holding said open end of the pipe arm at a predetermined level above the bottom of said container when said cover is opened.

2. In a device of the type described, the combination of a fluid container, an outlet for said container, a pipe movably connected to said outlet, a cover, a chain connected between said pipe and said cover, and a pair of spaced lugs cooperating with said chain when said cover is opened to hold the open end of said pipe at a predetermined level in said container.

3. In a device of the type described, the combination with a fluid container having an inlet pipe leading thereto and an outlet pipe extending therefrom, a cover for said inlet pipe, a flexible connection between the lower of said outlet pipe and said cover, and means associated with said cover and located at the mouth of said inlet pipe for creating a storage reserve in said container when the cover is open by holding said flexible connection in raised position.

4. In a device of the type described, the combination with a fluid container having an outlet pipe extending therefrom and an inlet opening provided with a cover, a chain operably connected between the inner end of said outlet pipe and said cover whereby the chain is lifted upwardly to raise said inner end of the outlet pipe when the cover is opened to fill said container, and means for holding said chain in lifted position when the cover is closed.

In witness whereof, I have hereunto subscribed my name.

GEORGE R. FOLDS.